Aug. 23, 1932.     M. F. CARR     1,873,872
CONNECTING MEMBER FOR CONTINUOUS FASTENERS
Filed Jan. 9, 1931
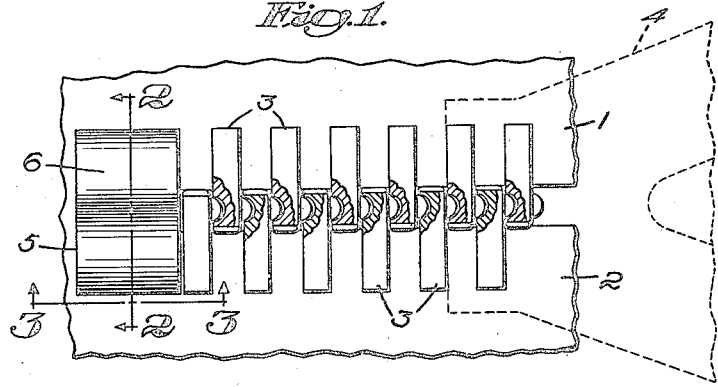
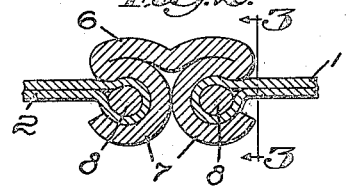 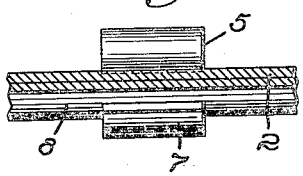
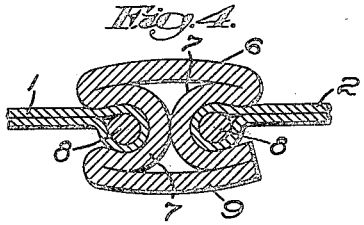
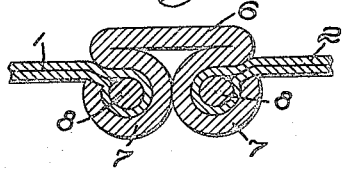
Inventor:
Moses F. Carr
by Emery, Booth, Varney & Townsend
Attys

Patented Aug. 23, 1932

1,873,872

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

CONNECTING MEMBER FOR CONTINUOUS FASTENERS

Application filed January 9, 1931. Serial No. 507,674.

My invention aims to provide improvements in a combined connecting and stop member for a separable fastener installation of the continuous fastener type.

In the drawing which illustrates preferred embodiments of my invention:—

Figure 1 is a plan view of a portion of a separable fastener installation showing my improved connecting and stop member;

Fig. 2 is a section taken on the line 2—2 of Figure 1;

Fig. 3 is a section taken on the line 3—3 of Figure 1;

Fig. 4 is a section similar to that shown in Fig. 2, but showing a modified form of connecting and stop member; and Fig. 5 is a section similar to that shown in Fig. 2, but showing a slightly modified form of connecting and stop member.

Referring to my invention as illustrated by the annexed drawing, I have shown a combined connecting and stop member particularly adapted for use in connection with installations of so-called continuous fasteners. The installation illustrated includes a pair of flexible stringers 1 and 2 of usual construction, at one edge of each of which is a series of separable fastener elements 3 adapted to be engaged and disengaged by the use of a usual slider 4 (shown in dotted lines, Figure 1) and a combined connecting and stop member 5. The member 5 secures the stringers together adjacent to one end of the series of fasteners, as shown in Figure 1, thereby holding the strips in predetermined relation to each other and it also acts as a stop to prevent the slider from sliding off the fasteners at that end.

Heretofore combined connecting and stop members have been cut from a bar of desired cross-section or have been cast and in most instances have been made relatively narrow to permit ease of clamping them to the beaded edges of the stringers. When using the relatively narrow connecting members it has been the usual practice to use three or more of them side by side in order to provide a strong installation.

My improved device is pressed from a single piece of sheet metal in strip form and is bent to provide a top plate portion 6 and two underlying attaching portions 7—7, as best shown in Fig. 2. Each attaching portion 7 extends from an end of the plate portion 6 directly inwardly and then curves downwardly and outwardly so that the end is spaced from the end of the plate to permit insertion of the beaded edge 8 of the string into the space enclosed by the attaching portion. When the edges 8 of the stringers are inserted into the attaching portions suitable setting means apply pressure to the top plate 6 and the under sides of the attaching portions to crimp them and squeeze the beaded edges 8, as best shown in Fig. 2.

The top plate portion 6 may be made to conform with the curved surfaces of the attaching portions 7—7 (Figs. 1 and 2) or may be flat (Fig. 5.) Furthermore, the attaching portions 7—7 may be made long enough so that the material of the stringers may be gripped between the edges at the entrances to the spaces into which the beaded portions fit, as best shown in Fig. 5.

The device shown in Fig. 4 differs from that shown in Fig. 2 only in that it has another plate portion 9 extending from one of the attaching portions 7 over both portions and thereby provides a finished appearance to the device at that side opposite to the plate portion 6. This type of device may be attached with either plate portion at the top side of the installation and, therefore, it is not necessary to be careful in attaching the member to the stringers.

The devices which I have illustrated are simple in construction, durable and may be made in any suitable width since they are made from sheet material. Furthermore, by making them of sheet material they are easy to form and easy to attach.

While I have illustrated and described preferred embodiments of my invention I do not wish to be limited thereby, because the scope of my invention is best defined by the following claims.

1. In a multiple operated fastener installation having a pair of stringers, a series of interengaging fastener elements secured to the adjacent edges of said stringers and a slider for opening and closing the fasteners, a connecting member adjacent to one end of the series of fastener elements and securing the stringers together at that end, said connecting member comprising a plate-like portion and two underlying substantially U-shaped attaching portions each of which engages over the edge of a stringer and is concealed by said plate-like portion and each of said attaching portions being connected adjacent to its open end to an end of said plate-like portion.

2. In a multiple operated fastener installation having a pair of stringers, a series of interengaging fastener elements secured to the adjacent edges of said stringers and a slider for opening and closing the fasteners, a connecting member adjacent to one end of the series of fastener elements and securing the stringers together at that end, said connecting member being formed from a single piece of sheet metal of uniform width and having a top plate portion and two attaching portions formed by extending the material from each end of the plate first inwardly under the plate then downwardly and outwardly in spaced relation to the plate, and said attaching portions being curved in cross-section and clipped into engagement with the adjacent edges of the stringers to prevent accidental loosening of the device from the stringers by lateral stresses exerted thereon.

3. A connecting member of the class described comprising a plate-like portion, two underlying attaching portions concealed by said plate portion and each connected to an end thereof and a second plate-like portion extending from one edge of one of the attaching portions in spaced relation to the other plate-like portion, said plate-like portions providing means for supporting and concealing the said attaching portions.

In testimony whereof, I have signed my name to this specification.

MOSES F. CARR.